No. 819,257. PATENTED MAY 1, 1906.
E. H. VOGEL.
ELEVATOR.
APPLICATION FILED NOV. 27, 1905.
5 SHEETS—SHEET 1.
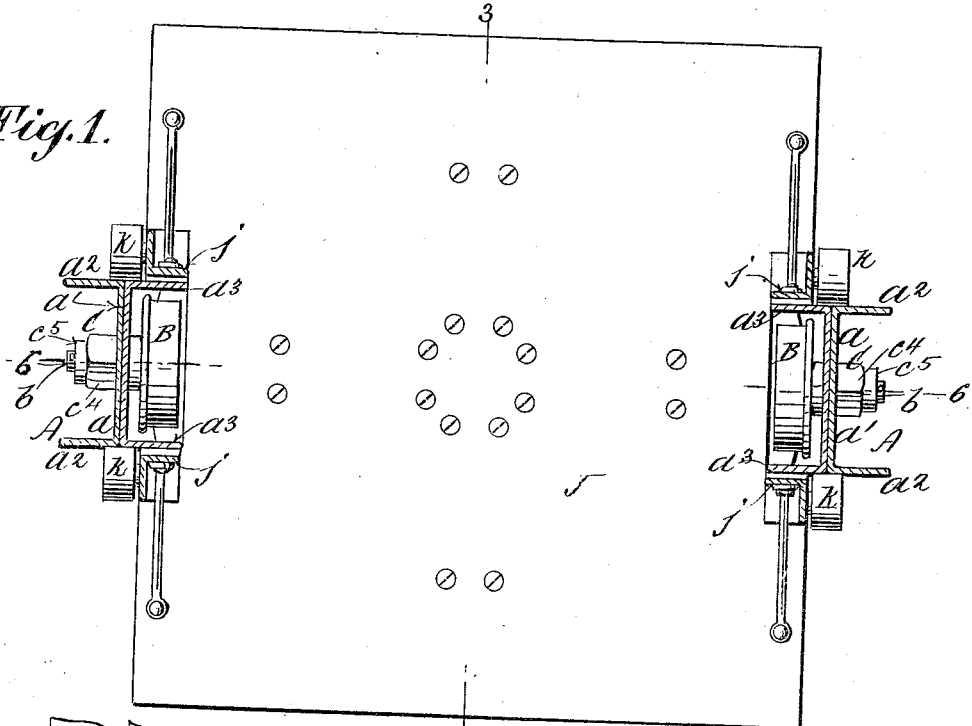
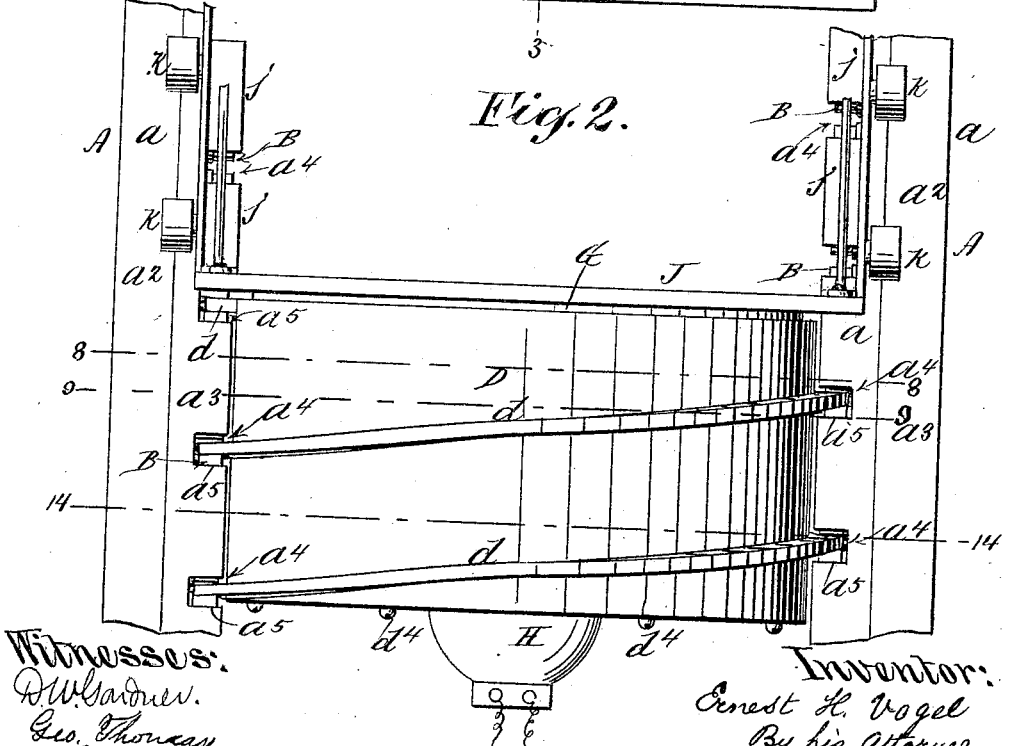
Witnesses:
D. W. Gardner.
Geo. Thomas.
Inventor:
Ernest H. Vogel
By his Attorney
Geo. W. Miatt No. 819,257. PATENTED MAY 1, 1906.
E. H. VOGEL.
ELEVATOR.
APPLICATION FILED NOV. 27, 1905.
5 SHEETS—SHEET 2.
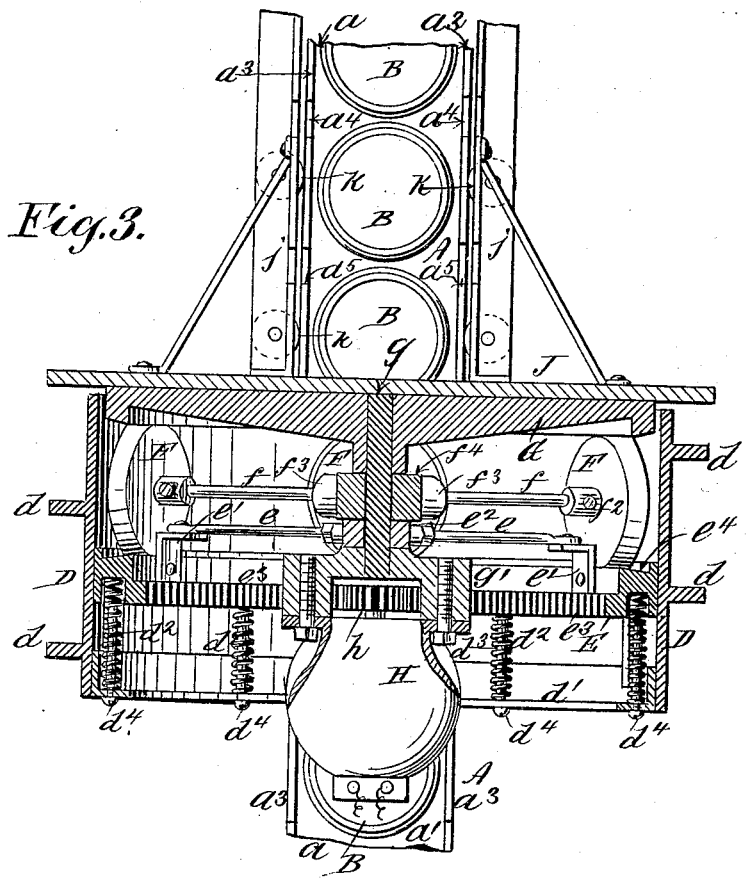
Fig.3.
Fig.4.
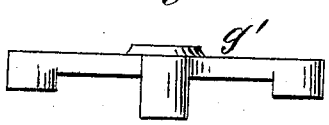
Fig.5.
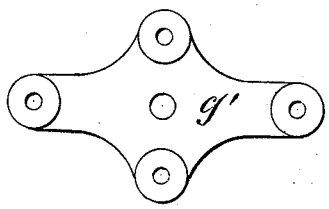
Witnesses:
D. W. Gardner.
Geo. Thomas
Inventor:
Ernest H. Vogel
By his attorney
Geo. Wm Miatt No. 819,257. PATENTED MAY 1, 1906.
E. H. VOGEL.
ELEVATOR.
APPLICATION FILED NOV. 27, 1905.
5 SHEETS—SHEET 3.
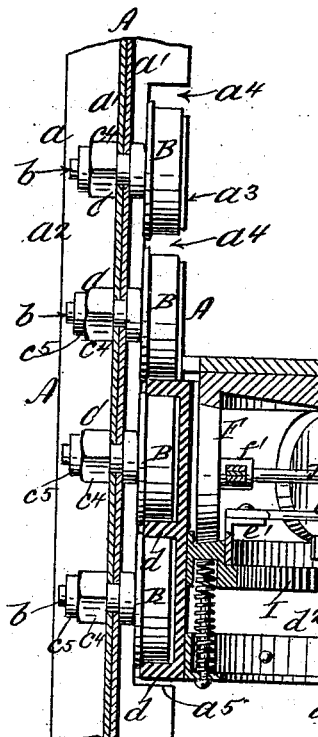
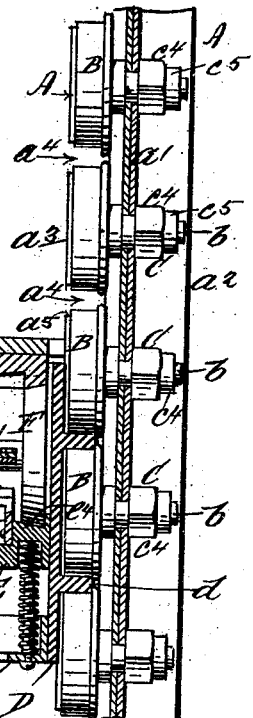
Fig. 6.
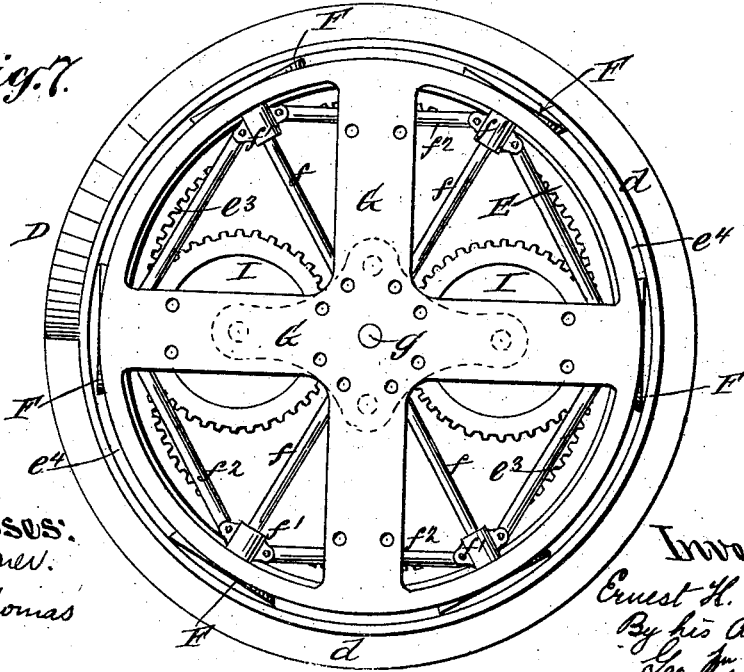
Fig. 7.
Witnesses:
D. W. Gardner.
Geo. Thomas
Inventor:
Ernest H. Vogel
By his Attorney
Geo. Wm Miatt No. 819,257. PATENTED MAY 1, 1906.
E. H. VOGEL.
ELEVATOR.
APPLICATION FILED NOV. 27, 1905.
5 SHEETS—SHEET 4.
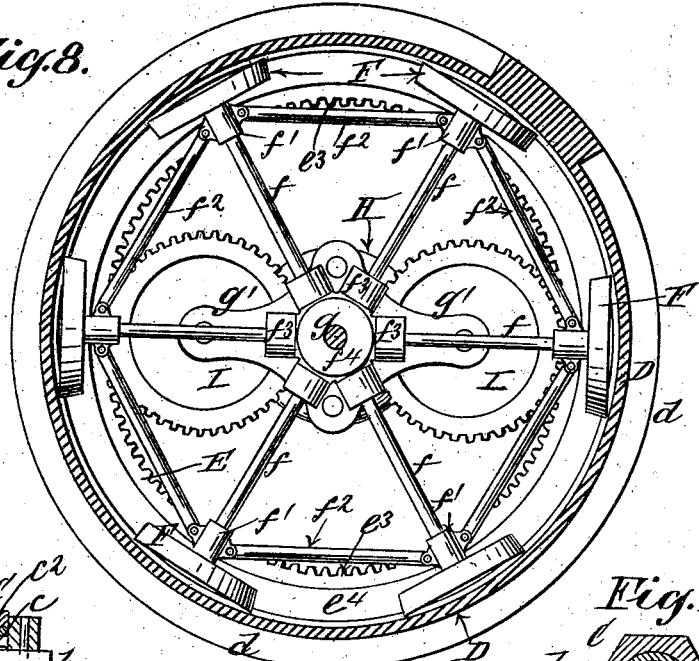
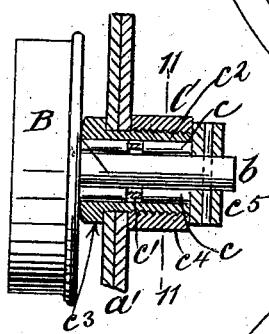
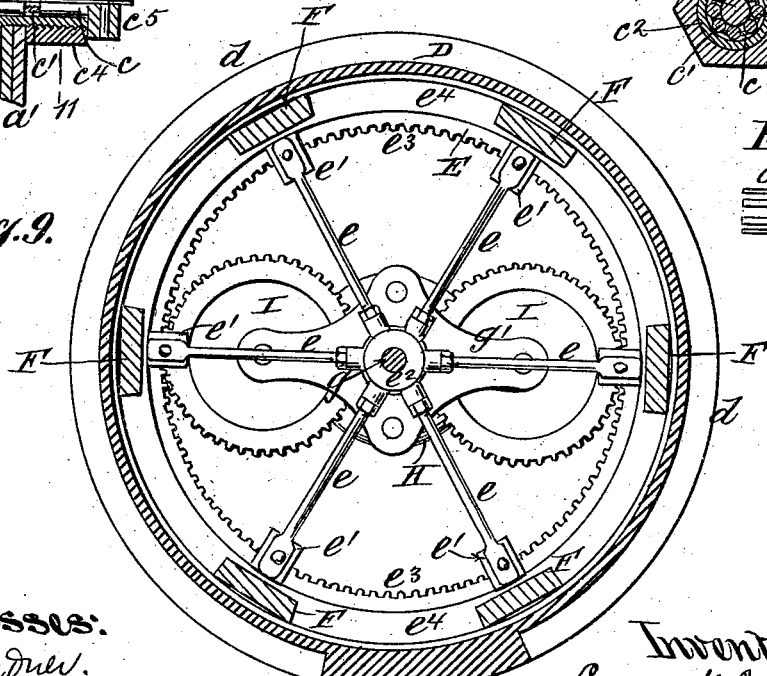
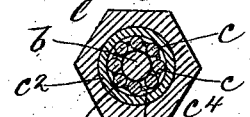
Witnesses:
D. W. Gardner.
Geo. Thomas
Inventor:
Ernest H. Vogel
By his attorney
Geo. Wm Miatt No. 819,257. PATENTED MAY 1, 1906.
E. H. VOGEL.
ELEVATOR.
APPLICATION FILED NOV. 27, 1905.
5 SHEETS—SHEET 5.
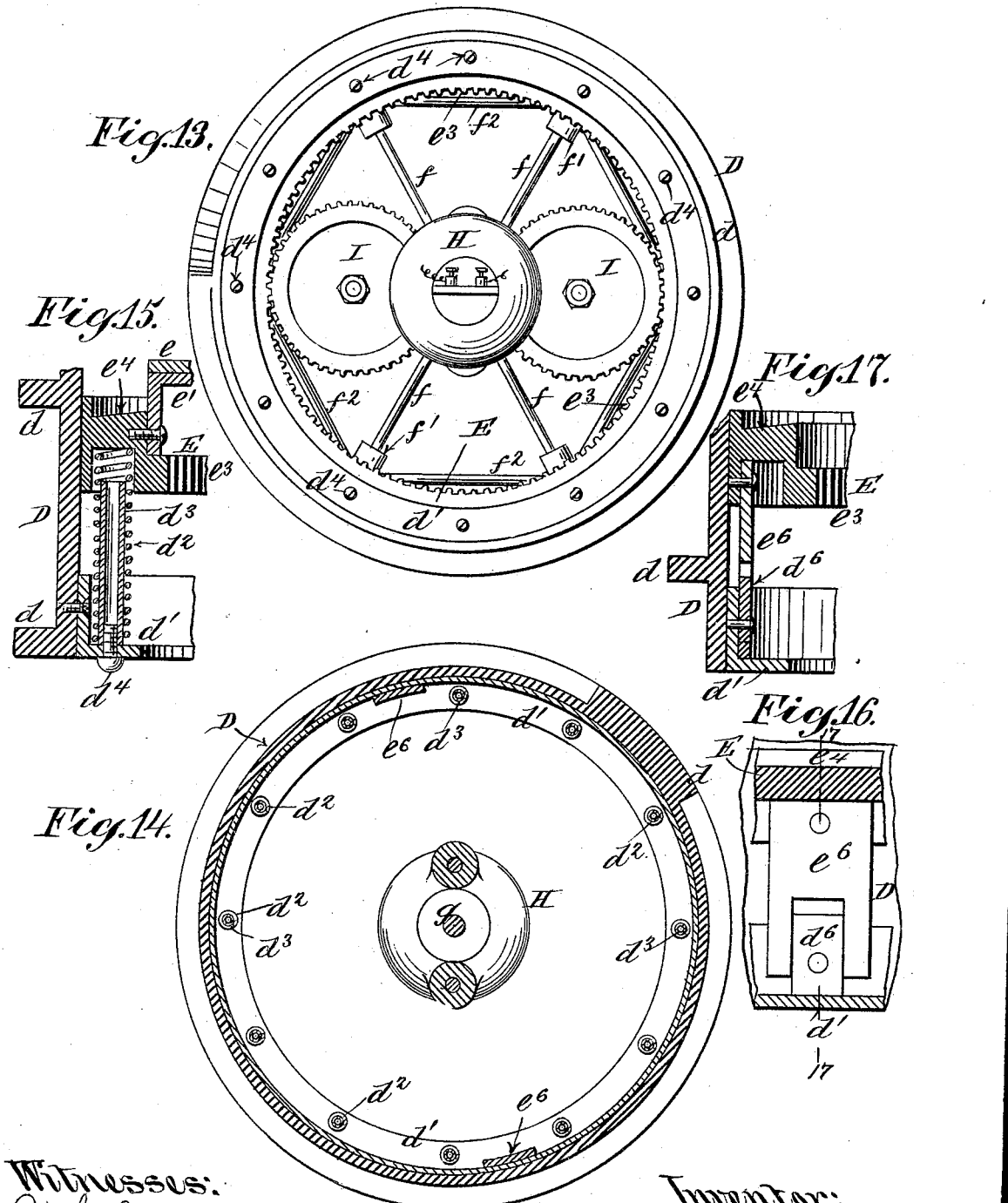

UNITED STATES PATENT OFFICE.

ERNEST H. VOGEL, OF NEW YORK, N. Y.

ELEVATOR.

No. 819,257.
Specification of Letters Patent.
Patented May 1, 1906.

Application filed November 27, 1905. Serial No. 289,147.

*To all whom it may concern:*

Be it known that I, ERNEST H. VOGEL, a citizen of the United States, residing in the borough of Brooklyn, city of New York, county of Kings, and State of New York, have invented certain new and useful Improvements in Elevators, of which the following is a specification.

My improvements relate to the class of elevators or lifts in which the platform is supported upon a worm-drum engaging with vertically-arranged rack-rolls and rotated by an electric motor suspended underneath the platform and within said worm-drum, after the manner set forth in my Letters Patent No. 765,348, dated July 19, 1904, and No. 783,809, dated February 28, 1905.

The object of my present invention is to afford a certain degree of elasticity and resilience in the support of the platform, so as to obviate danger from sudden strain or jar in loading, and also to reduce frictional contact and noise in operation to a minimum degree.

The invention consists in the construction and arrangement of parts herein described and claimed specifically, a distinguishing feature being the means by which a resilient support is afforded for the platform through the medium of a floating rack and roller raceway interposed between the platform and the worm-drum.

In the accompanying drawings, Figure 1 is a horizontal section through the vertical rack-roll standards, taken above the elevator-platform; Fig. 2, a side elevation of the elevator and adjacent portions of the vertical rack-roller standards. Fig. 3 is a sectional elevation taken on plane of line 3 3, Fig. 1. Fig. 4 is an elevation in detail of the hanger used for the support of the motor and gears. Fig. 5 is a view of the under side of the same. Fig. 6 is a sectional elevation taken upon plane of line 6 6, Fig. 1. Fig. 7 is a plan of the drum and parts contained therein, the platform being removed. Fig. 8 is a horizontal section upon plane of line 8 8, Fig. 2. Fig. 9 is a horizontal section upon plane of line 9 9, Fig. 2. Fig. 10 is a sectional elevation through one of the antifriction-roll bearings. Fig. 11 is a transverse section upon plane of line 11 11, Fig. 10. Fig. 12 is an elevation of the antifriction-roller cage used in the bearings. Fig. 13 is a view of the under side of the drum. Fig. 14 is a horizontal section upon plane of line 14 14, Fig. 2. Fig. 15 is a section upon an enlarged scale, showing one of the resilient supports for the floating rack-ring, &c. Fig. 16 is a sectional elevation upon an enlarged scale, showing the means for coupling the floating-ring to the drum; Fig. 17, a section upon plane of line 17 17, Fig. 16.

The vertical rack-roll standards A A are of peculiar construction in that they are each formed of two channel-irons $a$ $a$, having their webs $a'$ $a'$ secured together back to back. This not only affords a maximum of strength and rigidity with lightness and simplicity of structure, but the inwardly-projecting flanges $a^2$ $a^2$ also afford protection for the rack-rolls B B on one (the inner) side of each standard, while the outwardly-projecting flanges $a^3$ $a^3$ afford protection for the roll-spindles $b$ $b$ and antifriction-roll spindle-bearings C C on the other (or outer) side of each standard A.

The antifriction-roll spindle-bearings C C are constructed as follows: The antifriction-rollers $c$ $c$ are held loosely in a cage $c'$, (see Figs. 10 and 11,) which spaces them and holds them apart in proper relation to each other, both cage $c'$ and antifriction-rollers $c$ $c$ fitting in a sleeve or bushing $c^2$. This bushing $c^2$ is threaded externally at one extremity and formed with a flange $c^3$ at the other. The body of each sleeve or bushing $c^2$ is inserted in and extends through coinciding perforations formed in the webs $a'$ $a'$ of the standards A, the flange $c^3$ resting against the inner surface of the standard and the bushing $c^2$ being secured in position by a nut $c^4$, engaging the threaded portion thereof and screwing up against the outer side of the standard, so as to clamp the latter firmly between it and the said flange $c^3$, as will be fully understood by reference to Fig. 10. The rolls $c$ $c$ and cage $c'$ are held in position in the bushing $c^2$ by the back of the roll B at one end thereof, and by the collar or disk $c^5$ at the other, said collar being keyed to the outer end of the spindle $b$ after the parts are assembled. The inwardly-projecting flanges $a^3$ of each standard A are formed with recesses $a^4$ to admit of the passage of the spiral worm $d$, which projects from the periphery of the rotatable drum D, the under sides $a^5$ of said recesses $a^4$ performing an important function in that they afford a safe support for the drum D in case of the breaking or displacement of the rolls B in whole or in part.

To the inner lower edge of the drum D is secured an angle-iron, the horizontal member of which forms an annular flange $d'$, upon which rest a series of springs $d^2$, which are centralized and sustained against lateral displacement by posts $d^3$. The posts $d^3$ are preferably made of sections of tubing threaded internally at one end, so as to engage with a securing-screw $d^4$, as illustrated in Fig. 15. Resting on these springs $d^2$ is a floating rack-ring E, fitting peripherally snugly within the drum D. This rack-ring E is centralized by radial rods $e$, secured at their outer ends to the lugs $e'$ on the ring E and at their inner ends to the hubs $e^2$, rotatable upon the spindle. The ring E is formed with an internal annular rack $e^3$ and with an annular track or raceway $e^4$. Upon the track $e^4$ rests a series of antifriction-wheels F, rigidly secured to the outer ends of axles $f$, arranged radially with relation to the central spindle $g$, as will be seen more particularly by reference to Fig. 8. The axles $f$ adjacent to the antifriction-wheels F are supported in bearings $f'$, which are linked together by rods $f^2$, and the inner ends of said axles $f$ are flanged and rest in bearing-boxes $f^3$, formed upon the hub $f^4$ upon the spindle $g$, antifriction-balls $f^5$ being interposed between the flanged ends of the axles and the box-caps, as shown in Fig. 6.

The antifriction-wheels intervene between the rotatable rack-ring E and the non-rotatable platform-support G, to which is rigidly secured the spindle $g$. To the lower end of the latter is rigidly secured the cross-head $g'$, upon which is suspended the electric motor H and upon which are mounted the gear-wheels I I, each meshing with the pinion $h$ of the motor H on one side and with the annular rack $e^3$ of the floating rack-ring E on the other. The ends of the spindle $g$ are driven into holes formed for their reception in the platform-support G and in the cross-head $g'$, so that the spindle is practically integral with the parts, the ends of the spindle being originally a trifle larger in diameter than the diameter of the holes into which they are forced.

The rack-ring E and the drum D are coupled together, so as to rotate in unison, while admitting of a degree of vertical play or movement of the rack-ring E upon the drum by any suitable means, as by the use of one or more of the devices most clearly shown in Figs. 16 and 17, consisting of a recessed or bifurcated plate $e^6$ upon the rack-ring E, fitting over a guide-block $d^6$ on the drum, or rather on the angle-iron attached to the inner lower edge of the drum.

The platform J is attached rigidly to the platform-support G, and rigidly secured to it are posts $j$, formed, by preference, of angle-iron upon which are mounted bearing-rollers $k$, arranged to engage the opposite sides of the vertical standards A A, as will be understood by reference to Figs. 1, 2, and 3 of the drawings.

In operation the platform J, support G, spindle $g$, and cross-head $g'$, being held against rotation by reason of the engagement of the bearing-rollers $k$ with the sides of the vertical rack-roll standards A A, the pinion $h$ of the electric motor H transmits motion through the gears I I to the rack $e^3$ of the ring E. The latter, while free to move independently in a vertical direction within certain limits, being coupled to the drum D through the medium of plates $e^6$ $d^6$, rotates with the ring E, which, by reason of the engagement of its worm $d$ with the rack-rolls B, raises or lowers the drum and platform according to the direction of rotation imparted to the motor. The antifriction-wheels interposed between the rack-ring E and the platform-support G, traveling as they do at one-half the speed of the rack-ring and drum, materially reduce the friction and noise of operation and render the action smooth and uniform. This result is also materially contributed to by the resilient support afforded to the rack-ring platform, &c., which allows the parts to adapt themselves to the stress of load without subjecting the parts to sudden and dangerous jar.

What I claim as my invention, and desire to secure by Letters Patent, is—

1. In an elevating device of the character designated, the combination with the platform, of an electrical motor suspended thereon, a driving-pinion actuated by said motor, intermediate gearing supported by the platform and arranged to transmit motion from said driving-pinion to a floating rack-ring, said floating rack-ring resting upon springs supported upon a worm-drum, said worm-drum, means for coupling the said rack-ring and drum so that they will rotate together while allowing the ring to move vertically upon its spring-supports antifriction-wheels interposed between said floating rack-ring and the platform, and vertically-arranged supporting-rolls engaging the peripheral worm on said drum, for the purpose described.

2. In an elevating device of the character designated, the combination with the platform, of an electrical motor suspended thereon, a driving-pinion actuated by said motor, intermediate gearing supported by the platform and arranged to transmit motion from the said driving-pinion to a floating rack-ring, said floating rack-ring resting upon springs supported upon a worm-drum, said worm-drum, means for centralizing said floating rack-ring with relation to the worm-drum, means for coupling said floating rack-ring and drum so that they will rotate together while allowing the ring to move vertically upon its spring-supports, antifriction-wheels interposed between said floating rack-ring and the platform, and vertically - arranged supporting-rolls engaging the peripheral worm on said drum, for the purpose described.

3. In an elevating device of the character designated, the combination with the platform, of an electrical motor suspended thereon, a driving-pinion actuated by said motor, intermediate gearing supported by the platform and arranged to transmit motion from said driving-pinion to a floating rack-ring, said floating rack-ring resting upon springs supported upon the worm-drum, said springs, means for centralizing and supporting said springs against lateral displacement, said worm-drum, means for coupling the said rack-ring and drum so that they will rotate together while allowing the ring to move vertically upon its spring-supports, antifriction-wheels interposed between said floating rack-ring and the platform, and vertically - arranged supporting-rolls engaging the peripheral worm on said drum, for the purpose described.

4. In an elevating device of the character designated, the combination with the platform, of an electric motor suspended thereon, a driving-pinion actuated by said motor, intermediate gearing supported by the platform and arranged to transmit motion from said driving-pinion to a floating rack-ring, said floating rack-ring resting upon springs supported upon a worm-drum, said springs, means for centralizing and supporting said springs against lateral displacement, consisting of tubular posts internally threaded and secured to a flange on the drum by engaging-screws, said worm-drum, means for coupling the said rack-ring and drum so that they will rotate together while allowing the ring to move vertically upon its spring - supports, antifriction-wheels interposed between said floating rack-ring and the platform, and vertically-arranged supporting-rolls engaging the peripheral worm on said drum, for the purpose described.

5. In an elevating device of the character designated, the combination with the platform, of an electrical motor suspended thereon, a driving-pinion actuated by said motor, intermediate gearing supported by the platform and arranged to transmit motion from said driving-pinion to a floating rack-ring, said floating rack-ring resting upon springs supported upon a worm-drum, a central spindle supported on the platform a hub on said spindle and radial arms connecting said hub with the rack-ring for the purpose of centralizing the latter, said worm-drum, means for coupling the said rack-ring and drum so that they will rotate together while allowing the ring to move vertically upon its spring-supports, antifriction-wheels interposed between said floating rack-ring and the platform, and vertically-arranged supporting-rolls engaging the peripheral worm on said drum, for the purpose described.

6. In an elevating device of the character designated, the combination with the platform, of an electrical motor suspended thereon, a driving-pinion actuated by said motor, intermediate gearing supported by the platform and arranged to transmit motion from said driving-pinion to a floating rack-ring, said floating rack-ring resting upon springs supported upon a worm-drum, said worm-drum, means for coupling said floating rack-ring and drum so that they will rotate together while allowing the ring to move vertically upon its spring-supports, antifriction-wheels interposed between said floating rack-ring and the said platform, a central spindle supported upon the platform, a rotatable hub on said spindle, radial connections coupling said antifriction-wheels with said centralizing-hub and vertically-arranged supporting-rolls engaging with the peripheral worm on the said drum for the purpose described.

7. In an elevating device of the character designated, the combination with the platform, of an electrical motor suspended thereon, a driving-pinion actuated by said motor, intermediate gearing supported by the platform and arranged to transmit motion from said driving-pinion to a floating rack-ring, said floating rack-ring resting upon springs supported upon a worm-drum, said worm-drum, means for coupling said floating rack-ring and drum so that they will rotate together while allowing the ring to move vertically upon its spring-supports, antifriction-wheels interposed between said floating rack-ring and the said platform, said antifriction-wheels being rigidly attached to axles arranged radially with relation to a central spindle, said central spindle supported upon the platform, a rotatable hub on said spindle, bearings upon said rotatable hub adapted to receive and support the inner ends of the anti-friction-wheel axles, and vertically-arranged peripheral rolls engaging with the worm on said drum for the purpose described.

8. In an elevating device of the character designated, the combination with the platform, of an electrical motor suspended thereon, a driving-pinion actuated by said motor, intermediate gearing supported by the platform and arranged to transmit motion from said driving-pinion to a floating rack-ring, said floating rack-ring resting upon springs supported upon a worm-drum, said worm-drum, means for coupling said floating rack-ring and drum so that they will rotate together while allowing the ring to move vertically upon its spring-supports, antifriction-wheels interposed between said floating rack-ring and the said platform, said antifriction-wheels being rigidly attached to axles arranged radially with relation to a central spindle, said central spindle supported upon the platform, a rotatable hub on said spindle, antifriction-bearings upon said rotatable hub adapted to receive and support the inner ends of the antifriction-wheel axles and vertically-arranged peripheral rolls engaging with the worm on said drum for the purpose described.

9. In an elevating device of the character designated, the combination with the platform, of an electrical motor suspended thereon, a driving-pinion actuated by said motor, intermediate gearing supported by the platform and arranged to transmit motion from said driving-pinion to a floating rack-ring, said floating rack-ring resting upon springs supported upon a worm-drum, said worm-drum, means for coupling said rack-ring and drum so that they will rotate together while allowing the ring to move vertically upon its spring-supports, antifriction-wheels interposed between said floating rack-ring and the said platform, said antifriction-wheels being rigidly attached to axles arranged radially with relation to a central spindle, said central spindle supported upon the platform, a rotatable hub on said spindle, bearings upon said rotatable hub adapted to receive and support the inner ends of the antifriction-wheel axles, bearings on the axles of the antifriction-wheels adjacent to the latter spacing and connecting rods uniting said bearings, and vertically-arranged peripheral rolls engaging with the worm on said drum for the purpose described.

ERNEST H. VOGEL.

Witnesses:
D. W. GARDNER,
GEO. WM. MIATT.